(12) United States Patent
Jackson et al.

(10) Patent No.: US 8,737,590 B2
(45) Date of Patent: *May 27, 2014

(54) SYSTEM AND METHOD FOR HANDLING MULTIPLE CALL REDIRECTIONS IN A VOICE MESSAGING SYSTEM

(71) Applicant: AT&T Intellectual Property II, L.P., Atlanta, GA (US)

(72) Inventors: James Jackson, Austin, TX (US); Marco Schneider, Austin, TX (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/650,177

(22) Filed: Oct. 12, 2012

(65) Prior Publication Data

US 2013/0034216 A1 Feb. 7, 2013

Related U.S. Application Data

(63) Continuation of application No. 12/568,714, filed on Sep. 29, 2009, now Pat. No. 8,311,205.

(60) Provisional application No. 61/148,178, filed on Jan. 29, 2009.

(51) Int. Cl.
*H04M 3/42* (2006.01)

(52) U.S. Cl.
USPC .................................. 379/211.03; 379/88.25

(58) Field of Classification Search
USPC ........................................... 379/88.25, 211.03
See application file for complete search history.

(56) References Cited

U.S. PATENT DOCUMENTS

| | | | |
|---|---|---|---|
| 5,440,623 A | 8/1995 | Moore et al. | |
| 5,862,208 A | 1/1999 | McLampy et al. | |
| 6,097,791 A | 8/2000 | Ladd et al. | |
| 6,282,416 B1 | 8/2001 | Verdonk | |
| 6,516,060 B1 | 2/2003 | Foladare et al. | |
| 6,633,630 B1 | 10/2003 | Owens et al. | |
| 6,718,026 B1 | 4/2004 | Pershan et al. | |
| 6,807,268 B1 * | 10/2004 | Wierzbitzki et al. | 379/211.01 |
| 6,931,116 B1 | 8/2005 | Gross et al. | |
| 7,212,617 B2 | 5/2007 | Owens et al. | |
| 2005/0117731 A1 | 6/2005 | Pearson | |
| 2007/0165833 A1 | 7/2007 | Wolter et al. | |

* cited by examiner

Primary Examiner — Simon Sing
(74) Attorney, Agent, or Firm — Wolff & Samson, PC

(57) ABSTRACT

A method for handling multiple call redirections in a voice messaging platform is provided that includes receiving a call at the voice messaging platform, wherein multiple, sequential redirecting numbers are associated with the call. The method also includes selecting a mailbox associated with a last number associated with the call when it is determined that the last number does not belong to a closed user group, and depositing a message in the selected mailbox. When the last number belongs to the closed user group, and if the closed user group does not allow individual call forwarding control, the method selects the mailbox based on a closed user group preference. An apparatus and a computer readable medium are provided.

20 Claims, 3 Drawing Sheets

SYSTEM AND METHOD FOR HANDLING MULTIPLE CALL REDIRECTIONS IN A VOICE MESSAGING SYSTEM

This application is a continuation of prior application Ser. No. 12/568,714 filed Sep. 29, 2009, which claims the benefit of U.S. Provisional Application No. 61/148,178, filed Jan. 29, 2009, the disclosures of which are herein incorporated by reference.

BACKGROUND

The present disclosure relates generally to call forwarding and more particularly to handling multiple call redirections in a voice messaging system.

Unified messaging is the integration of different streams of communication (e.g., email, voicemail, short message service (SMS), fax, etc.) into a single, unified message store (e.g., a unified messaging platform) accessible from a variety of user devices.

Call forwarding is a feature available in some telephone networks that allows an incoming call to an unavailable called party to be forwarded (e.g., redirected) to another party (e.g., telephone number). Calls may be redirected multiple times before being answered.

If the call at the last forwarded number is not answered, and no further forwards are indicated, a voice message may be left by the caller.

BRIEF SUMMARY

Calls may be forwarded (e.g., redirected) multiple times before being answered in a call forwarding system. A system for call forwarding of messages may provide that, in the event that a final redirected recipient does not answer a call, then a voicemail message is left. A system for call forwarding of messages must determine at which telephone number to leave the voice message. The present disclosure provides novel improvements to the voice messaging system to use group/subscriber policies to determine which mailbox should ultimately be used for the message deposit/retrieval.

In a voice messaging system, when a first subscriber's number is called (e.g., to deposit and/or retrieve messages), the call may be redirected to the messaging platform (e.g., a unified messaging platform (UMP)). As a result, a call enters the voice messaging platform with the first subscriber's number in the Redirected Dialed Number Identification Service (RDNIS) redirecting field and a different Called Number in the Dialed Number Identification Service (DNIS) field. Based on the RDNIS, the messaging platform determines which mailbox to deposit a voice message into (and/or retrieve messages from).

When a call arrives at the voice messaging platform with multiple RDNIS entries, the following method may be executed. When it is determined that the last number does not belong to a closed user group, a mailbox associated with a last number associated with the call is selected. The message is deposited in the selected mailbox. When the last number belongs to the closed user group, and if the closed user group does not allow individual call forwarding control, the method provides for depositing the message in a mailbox based on a closed user group preference. If the closed user group preference allows call forwarding of messages, the method provides for depositing the message in a last mailbox associated with the last number. If the closed user group preference does not allow call forwarding of messages, the method provides for depositing the message in a first mailbox associated with a first number associated with the call which belongs to the closed user group. When the last number belongs to the closed user group, and if the closed user group does allow individual call forwarding control, the method provides for selecting the mailbox based on a user preference associated with a first number associated with the call which belongs to the closed user group. If the user preference allows call forwarding of messages, the method provides for depositing the message in a last mailbox associated with the last number. If the user preference does not allow call forwarding of messages, the method provides for depositing the message in a first mailbox associated with the first number.

An apparatus for handling multiple call redirections in a voice messaging platform is provided that includes means for receiving a call at the voice messaging platform, wherein multiple, sequential redirecting numbers are associated with the call. The apparatus also includes means for selecting a mailbox associated with a last number associated with the call when it is determined that the last number does not belong to a closed user group. The apparatus further includes means for depositing a message in the selected mailbox.

A computer readable medium encoded with computer executable instructions for handling multiple call redirections in a voice messaging platform is provided.

Such a system supports subscriber-level policies and closed group-level policies for handling multiple call redirections in voice messaging, including unified messaging platforms.

These and other advantages of the disclosure will be apparent to those of ordinary skill in the art by reference to the following detailed description and the accompanying drawings.

DETAILED DESCRIPTION

Figure 1:
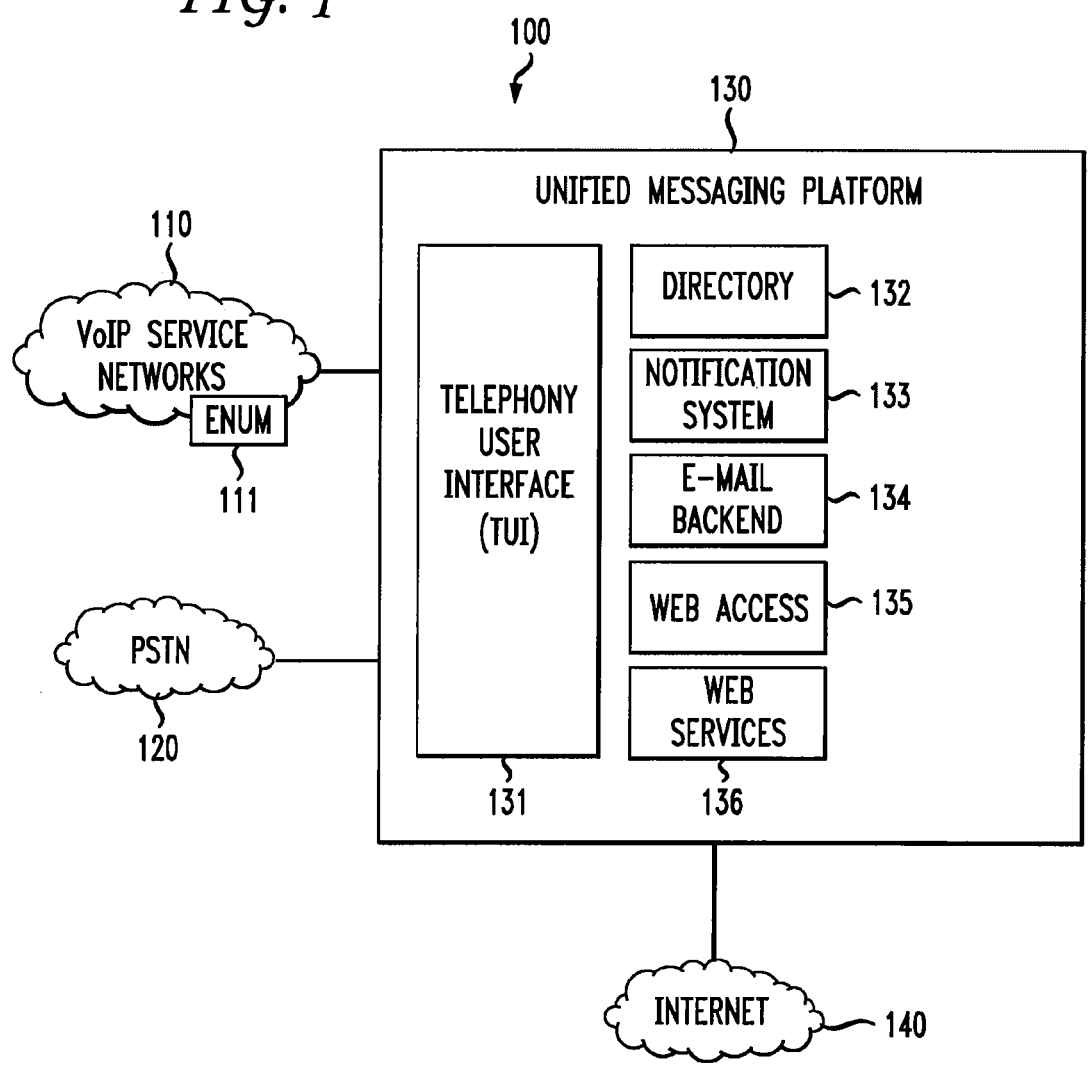
FIG. 1 is a schematic drawing of a call forwarding message control system according to an embodiment of the present disclosure.

Calls may be forwarded (e.g., redirected) multiple times before reaching a voice messaging system. The present disclosure provides novel improvements to the voice messaging system to use group/individual (e.g., enterprise/subscriber) policies to determine which mailbox should ultimately be used for the message deposit/retrieval.

In a voice messaging system, when a first subscriber's number is called (e.g., to deposit and/or retrieve messages), the call may be redirected to the messaging platform (e.g., a unified messaging platform (UMP)). As a result, a call enters the voice messaging platform with the first subscriber's number in the Redirected Dialed Number Identification Service (RDNIS) redirecting field and a different Called Number in the Dialed Number Identification Service (DNIS) field. Based on the RDNIS, the messaging platform determines which mailbox to deposit a voice message into (and/or retrieve messages from). A SIP diversion header is one exemplary method of maintaining multiple RDNIS entries for a call. Different telephony signaling protocols may include alternative methods of maintaining the RDNIS information.

Generally, a first voice messaging subscriber's telephone is configured to forward calls when busy or if not answered. The call forwarding number will redirect the call to the voice messaging platform. This configuration may be accomplished either in the first subscriber's telephone or in a network device (e.g., TDM switch, Soft Switch, etc.). In at least one embodiment, the call forwarding is handled by the service provider. Alternatively, the first voice messaging subscriber may override this feature by forwarding their telephone calls to a second telephone number at which they wish to answer their calls. If the second telephone corresponds to a second voice messaging subscriber of the voice messaging platform, the second telephone will, in turn, be call forwarded to the voice messaging platform when busy or if not answered. When such a call arrives at the voice messaging platform, there will be two redirecting numbers—corresponding to the first and second subscribers. Of course, multiple call forwards results in corresponding multiple redirect numbers.

If a final redirect call is not answered, a decision must be made as to which mailbox or mailboxes should be used to deposit a voicemail message. In particular, for the message deposit, the decision must be made whether to deposit the voice mail message into the mailbox of the first subscriber or the second subscriber (or the nth subscriber in the multiple user/forwards case). Additionally, the voice mail message may be deposited in multiple mailboxes.

In some instances, a closed user group is a group of messaging subscribers for which there is a special level of trust. Broadcast and other capabilities may exist between members of the group. For example, in the AT&T Unified Messaging Service, the "enterprise" concept corresponds to such a closed user group. In a closed user group, the message could be deposited in the first or last mailbox depending on the use-case. A user working in another office for a few hours may forward calls to that office, but may not want voice messages to be forwarded to the mailbox for the phone in that office. On the other hand, a user may be away from the office for an extended period and forward their calls to their secretary. In this case, the user may prefer that the messages also be forwarded to the last mailbox. Therefore, in the context of a closed user group, if a first subscriber forwards their telephone calls to the telephone of a second subscriber, a particular, variable user preference may drive the decision whether to forward to the second subscriber's telephone messages for calls originally directed to the first subscriber's telephone.

A mass market subscriber is not a member of a closed user group. That is, mass market subscribers are independent of each other and do not share any special relationship. If any subscriber (e.g., closed user group or mass market) forwards their telephone to another mass market subscriber, it is reasonable to assume that a voice message should be deposited in the mass market subscriber's mailbox regardless of the first telephone subscriber's status. The first telephone may or may not be a mass market subscriber. In any case, it may be preferable to deposit a message in the second subscriber's mailbox.

Mailboxes are class-of-service (CoS) enabled to indicate whether or not the subscriber can control multiple call forward handling. Subscribers with such a CoS are configured to optionally dictate whether voicemail should be locked to the initial mailbox or follow the call in a multiple call forwarding scenario. This option can be controlled by a telephone user interface (TUI), a subscriber browser interface (SBI), a web service API, or the like. An group-wide or enterprise-wide directory attribute may also be established for multiple call forward handling in the closed user group instance.

FIG. 1 depicts system 100 according to an embodiment of the present disclosure. System 100 includes unified messaging platform 130 and Voice over IP (VoIP) service networks 110. VoIP service networks 110 may include ENUM 111, which may provide a telephone number mapping function to allow a telephone system to interact with the internet. System 100 may also include a PSTN 120 and Internet 140. VoIP service networks 110 and PSTN 120 may communicate with telephony user interface (TUI) 131 of unified messaging platform 130. TUI 131 may include application servers and media servers, front-ended by call processing infrastructure such as media gateways, session border controllers, and softswitches. An Application Server within the TUI 131 may execute the algorithm according to an embodiment of the instant disclosure, and specifically the method shown in FIG. 2. TUI 131 may interact with the directory and determine the correct mailbox to deposit a voice mail message. Unified messaging platform 130 may also include directory 132 which operates to store service parameters, which may also include subscriber preferences, group preferences and/or settings. Unified messaging platform 130 may also include a notification system 133, E-mail back end 134, web access 135, and web services 136. Notification system 133 may identify the types of messages waiting, and may notify a user using SMS, e-mail, or any other appropriate system. E-mail back end 134 may operate to handle all messages, including voice messages, as e-mails. Web access 135 may operate as a web portal access to messages enabling clients to access their messages. Web services 136 may include a low level API allowing other portals from other service networks to interact with unified messaging platform 130. Internet 140 may interact with web services 136 in this manner.

Figure 2:
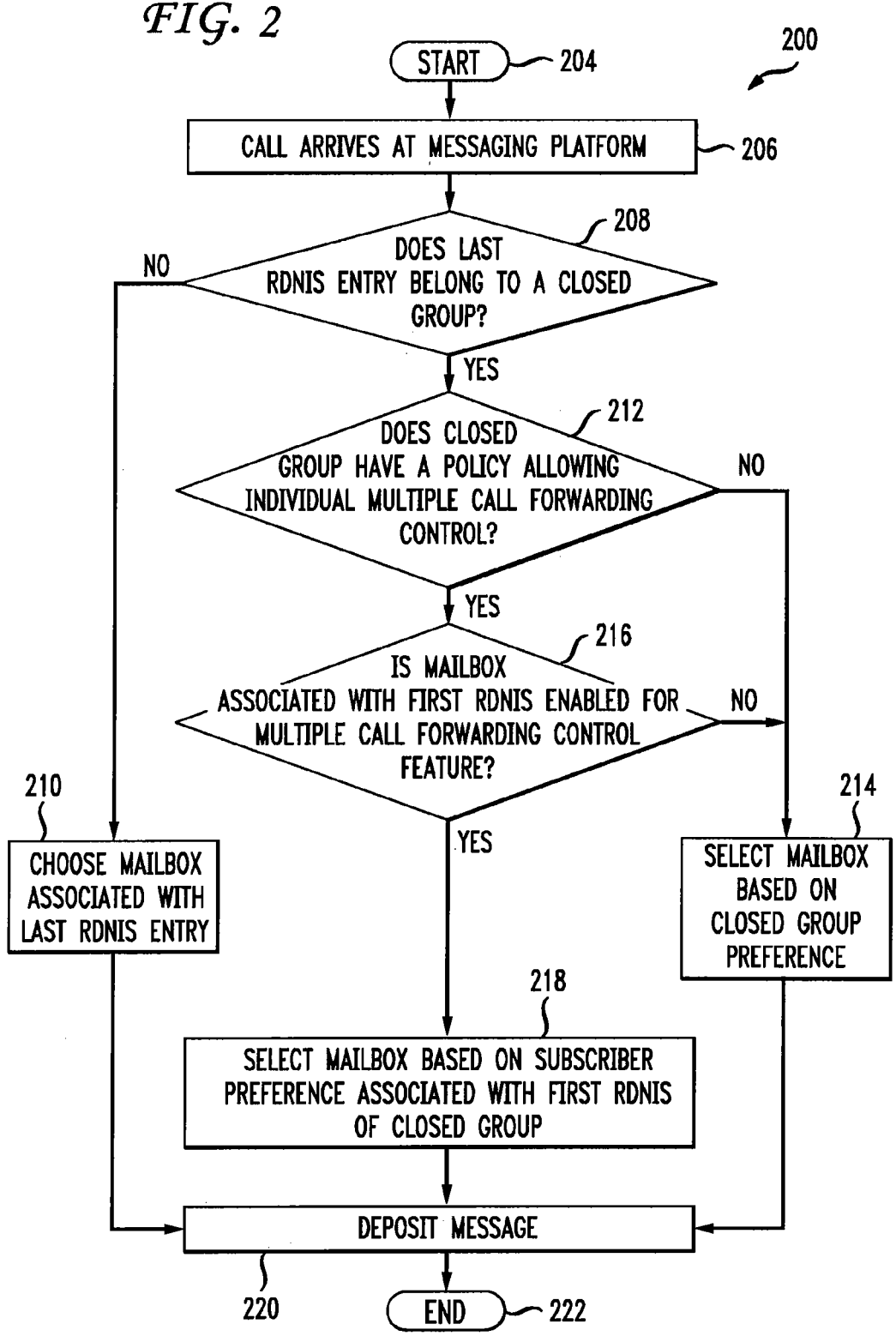
FIG. 2 is a flowchart of a method of call forwarding message control according to an embodiment of the present disclosure.

FIG. 2 is a flowchart of a method 200 of handling multiple call redirections in a voice messaging system according to an embodiment of the present disclosure. The method 200 of FIG. 2 supports subscriber-level policies and closed user group level (also referred to herein as closed group or enterprise level) policies for handling multiple call redirections in voice messaging, including unified messaging platforms. The flow chart of FIG. 2 illustrates a method according to an exemplary embodiment of the instant disclosure.

The flow in FIG. 2 starts at start 204 and proceeds to operation 206, which indicates that a call arrives at a messaging platform. From operation 206, the flow proceeds to decision 208, which asks whether the last RDNIS entry belongs to a closed group (also referred to herein as a closed user group or an enterprise). If the response to decision 208 is negative, the flow proceeds to operation 210, which indicates to choose a mailbox associated with the last RDNIS entry. From operation 210, the flow proceeds to operation 220, which indicates to deposit the message. From operation 220, the flow proceeds to end 222. If the response to decision 208 is affirmative, the flow proceeds to decision 212, which asks whether the closed group has a policy allowing the individual multiple call forwarding control. If the response to decision to 212 is negative, the flow proceeds to operation 214, which indicates to select a mailbox based on a closed group preference. From operation 214, the flow proceeds to operation 220. If the response to the decision 212 is affirmative, the flow proceeds to decision 216 which asks whether a mailbox associated with first RDNIS is enabled for multiple call forwarding control feature. If the response to decision 216 is negative, the flow proceeds to operation 214. If the response to decision 216 is affirmative, the flow proceeds to operation 218, which indicates to select a mailbox based on the subscriber preference associated with the first RDNIS of closed group. From operation 218, the flow proceeds to operation 220.

In regard to operation 214 and an exemplary method according to the instant disclosure, the closed group preference may indicate to deposit the message in the mailbox of the first RDNIS. Alternatively, the closed group preference may indicate to deposit the message in a last RDNIS mailbox. Other alternative closed group preferences are also possible. As further explanation of operation 218, the subscriber preference of operation 218 may indicate to select the mailbox of the first RDNIS for depositing the message. Alternatively, the subscriber preference may indicate to forward the message to the last RDNIS for depositing the message. For example, it may be determined that the mailbox associated with the first RDNIS entry is CoS enabled for the multiple call forwarding control feature. Alternatively, a first subscriber's preference may defer to a second or subsequent subscriber's preference, or may not indicate any preference. In the case of an undeclared or prohibited preference, a default group preference may control. Other alternative subscriber preferences are also possible.

A method according to an exemplary embodiment of the instant disclosure provides that the mailbox associated with the first number is class-of-service (CoS) enabled to indicate whether a user can control multiple call forward handling. In the method, the call that arrives may have multiple Redirected Dialed Number Identification Service (RDNIS) entries in a signaling protocol header (for instance, a session initiation protocol (SIP) diversion header), and each of the RDNIS entries may correspond to different redirecting number. When it is determined that the last number does belong to a closed user group, the method may provide for determining all of the RDNIS entries associated with the closed user group, and identifying a first number associated with a first RDNIS entry belonging to the closed user group.

Figure 3:
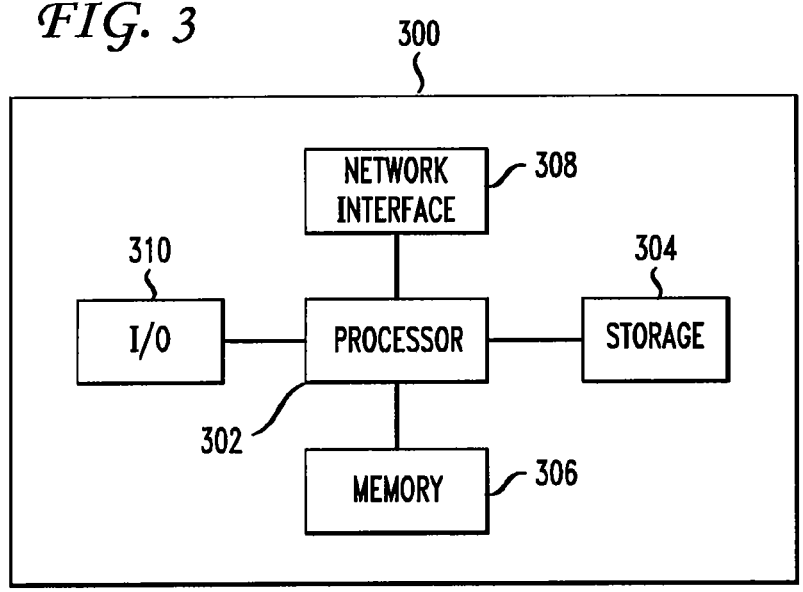
FIG. 3 is a schematic drawing of a computer.

FIG. 3 is a schematic drawing of a controller 300 according to an embodiment of the present disclosure. Controller 300 contains devices that form a controller including a processor 302 that controls the overall operation of the controller 300 by executing computer program instructions, which define such operation. The computer program instructions may be stored in a storage device 304 (e.g., magnetic disk, database, etc.) and loaded into memory 306 when execution of the computer program instructions is desired. Thus, applications for performing the herein-described method steps, such as those described above with respect to method 200 are defined by the computer program instructions stored in the memory 306 and/or storage 304 and controlled by the processor 302 executing the computer program instructions. The controller 300 may also include one or more network interfaces 308 for communicating with other devices via a network (e.g., global TMS 100). The controller 300 also includes input/output devices 310 that enable operator interaction with the controller 300. Controller 300 and/or processor 3202 may include one or more central processing units, read only memory (ROM) devices and/or random access memory (RAM) devices. One skilled in the art will recognize that an implementation of an actual computer for use in a portable communication device could contain other components as well, and that the controller of FIG. 3 is a high level representation of some of the components of such a portable communication device for illustrative purposes.

According to some embodiments of the present disclosure, instructions of a program (e.g., controller software) may be read into memory 306, such as from a ROM device to a RAM device or from a LAN adapter to a RAM device. Execution of sequences of the instructions in the program may cause the controller 300 to perform one or more of the method steps described herein. In alternative embodiments, hard-wired circuitry or integrated circuits may be used in place of, or in combination with, software instructions for implementation of the processes of the present disclosure. Thus, embodiments of the present disclosure are not limited to any specific combination of hardware, firmware, and/or software. The memory 306 may store the software for the controller 300, which may be adapted to execute the software program and thereby operate in accordance with the present disclosure and particularly in accordance with the methods described in detail above. However, it would be understood by one of ordinary skill in the art that the disclosed technology as described herein could be implemented in many different ways using a wide range of programming techniques as well as general-purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general-purpose program elements are known to those skilled in the art, and need not be described in detail herein.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method for determining which mailbox in a voice messaging platform in which to deposit a message associated with a call received at the voice messaging platform, wherein multiple sequential redirecting numbers are associated with the call, each of the multiple sequential redirecting numbers corresponding to a telephone number to which the call was forwarded prior the call being received at the voice messaging platform, the method comprising:
   determining whether a last number of the multiple sequential redirecting numbers associated with the call belongs to a closed user group;
   selecting, from a plurality of mailboxes each associated with a respective one of the multiple sequential redirecting numbers associated with the call, a mailbox associated with the last number of the multiple sequential redirecting numbers associated with the call in response to a determination that the last number of the multiple sequential redirecting numbers does not belong to a closed user group; and
   depositing a message in the mailbox selected from the plurality of mailboxes.

2. The method of claim 1, further comprising:
   in response to a determination that the last number belongs to the closed user group, and in response to a determination that the closed user group does not allow individual call forwarding control, selecting a mailbox from the plurality of mailboxes based on a closed user group preference.

3. The method of claim 2, wherein selecting a mailbox from the plurality of mailboxes based on a closed user group preference comprises:
in response to a determination that the closed user group preference allows call forwarding of messages, selecting the mailbox associated with the last number.

4. The method of claim 2, wherein selecting a mailbox from the plurality of mailboxes based on a closed user group preference comprises:
in response to a determination that the closed user group preference does not allow call forwarding of messages, selecting a mailbox associated with a first number of the multiple sequential redirecting numbers which belongs to the closed user group.

5. The method of claim 1, further comprising:
in response to a determination that the last number belongs to the closed user group, and in response to a determination that the closed user group does allow individual call forwarding control, selecting a mailbox from the plurality of mailboxes based on a user preference associated with a first number of the multiple sequential redirecting numbers which belongs to the closed user group.

6. The method of claim 5, wherein selecting a mailbox from the plurality of mailboxes based on a user preference associated with a first number of the multiple sequential redirecting numbers which belongs to the closed user group comprises:
in response to a determination that the user preference allows call forwarding of messages, selecting the mailbox associated with the last number.

7. The method of claim 5, wherein selecting a mailbox from the plurality of mailboxes based on a user preference associated with a first number of the multiple sequential redirecting numbers which belongs to the closed user group comprises:
in response to a determination that the user preference does not allow call forwarding of messages, selecting a mailbox associated with the first number which belongs to the closed user group.

8. The method of claim 5, wherein the mailbox associated with the first number is class-of-service enabled to indicate whether a user can control multiple call forward handling.

9. The method of claim 1, wherein the call has multiple Redirected Dialed Number Identification Service entries in a signaling protocol header, wherein each of the Redirected Dialed Number Identification Service entries corresponds to different redirecting number.

10. The method of claim 9, further comprising:
in response to a determination that the last number does belong to the closed user group, determining all of the Redirected Dialed Number Identification Service entries associated with the closed user group, and identifying a first number associated with a first Redirected Dialed Number Identification Service entry belonging to the closed user group.

11. An apparatus for determining which mailbox in a voice messaging platform in which to deposit a message associated with a call received at the voice messaging platform, wherein multiple sequential redirecting numbers are associated with the call, each of the multiple sequential redirecting numbers corresponding to a telephone number to which the call was forwarded prior the call being received at the voice messaging platform, the apparatus comprising:
a processor; and
a memory communicatively coupled to the processor, the memory to store computer program instructions, which when executed on the processor cause the processor to perform operations comprising:
determining whether a last number of the multiple sequential redirecting numbers associated with the call belongs to a closed user group;
selecting, from a plurality of mailboxes each associated with a respective one of the multiple sequential redirecting numbers associated with the call, a mailbox associated with the last number of the multiple sequential redirecting numbers associated with the call in response to a determination that the last number of the multiple sequential redirecting numbers does not belong to a closed user group; and
depositing a message in the mailbox selected from the plurality of mailboxes.

12. The apparatus of claim 11, the operations further comprising:
in response to a determination that the last number belongs to the closed user group, and in response to a determination that the closed user group does not allow individual call forwarding control, selecting a mailbox from the plurality of mailboxes based on a closed user group preference.

13. The apparatus of claim 12, wherein selecting a mailbox from the plurality of mailboxes based on a closed user group preference comprises:
in response to a determination that the closed user group preference allows call forwarding of messages, selecting the mailbox associated with the last number.

14. The apparatus of claim 12, wherein selecting a mailbox from the plurality of mailboxes based on a closed user group preference comprises:
in response to a determination that the closed user group preference does not allow call forwarding of messages, selecting a mailbox associated with a first number of the multiple sequential redirecting numbers which belongs to the closed user group.

15. The apparatus of claim 11, the operations further comprising:
in response to a determination that the last number belongs to the closed user group, and in response to a determination that the closed user group does allow individual call forwarding control, selecting a mailbox from the plurality of mailboxes based on a user preference associated with a first number of the multiple sequential redirecting numbers which belongs to the closed user group.

16. The apparatus of claim 15, wherein selecting a mailbox from the plurality of mailboxes based on a user preference associated with a first number of the multiple sequential redirecting numbers which belongs to the closed user group comprises:
in response to a determination that the user preference allows call forwarding of messages, selecting the mailbox associated with the last.

17. The apparatus of claim 15, wherein selecting a mailbox from the plurality of mailboxes based on a user preference associated with a first number of the multiple sequential redirecting numbers which belongs to the closed user group comprises:
in response to a determination that the user preference does not allow call forwarding of messages, selecting a mailbox associated with the first number which belongs to the closed user group.

18. A non-transitory computer readable medium storing computer program instructions for determining which mailbox in a voice messaging platform in which to deposit a message associated with a call received at the voice messaging platform, wherein multiple sequential redirecting numbers are associated with the call, each of the multiple sequential redirecting numbers corresponding to a telephone number to which the call was forwarded prior the call being received at the voice messaging platform, the computer program instructions, when executed on a processor, cause the processor to perform operations comprising:

determining whether a last number of the multiple sequential redirecting numbers associated with the call belongs to a closed user group;

selecting, from a plurality of mailboxes each associated with a respective one of the multiple sequential redirecting numbers associated with the call, a mailbox associated with the last number of the multiple sequential redirecting numbers associated with the call in response to a determination that the last number of the multiple sequential redirecting numbers does not belong to a closed user group; and depositing a message in the mailbox selected from the plurality of mailboxes.

19. The non-transitory computer readable medium of claim 18, wherein the operations further comprise:

in response to a determination that the last number belongs to the closed user group, and in response to a determination that the closed user group does not allow individual call forwarding control, selecting a mailbox from the plurality of mailboxes based on a closed user group preference;

wherein selecting a mailbox from the plurality of mailboxes based on a closed user group preference comprises:

in response to a determination that the closed user group preference allows call forwarding of messages, selecting the mailbox associated with the last number; and in response to a determination that the closed user group preference does not allow call forwarding of messages, selecting a mailbox associated with a first number of the multiple sequential redirecting numbers which belongs to the closed user group.

20. The non-transitory computer readable medium of claim 18, wherein the operations further comprise:

in response to a determination that the last number belongs to the closed user group, and in response to a determination that the closed user group does allow individual call forwarding control, selecting a mailbox from the plurality of mailboxes based on a user preference associated with a first number of the multiple sequential redirecting numbers which belongs to the closed user group;

wherein selecting a mailbox from the plurality of mailboxes based on a user preference associated with a first number of the multiple sequential redirecting numbers which belongs to the closed user group comprises:

in response to a determination that the user preference allows call forwarding of messages, selecting the mailbox associated with the last; and in response to a determination that the user preference does not allow call forwarding of messages, selecting a mailbox associated with the first number which belongs to the closed user group.

\* \* \* \* \*